US012663810B2

(12) United States Patent
Leonard

(10) Patent No.: US 12,663,810 B2
(45) Date of Patent: Jun. 23, 2026

(54) SYSTEMS, METHODS AND NON-TRANSITORY COMPUTER-READABLE MEDIA FOR VEHICLE NAVIGATION USING PATH FOLLOWING BASED ON CONTROL GUIDE POINT

(71) Applicant: Deere & Company, Moline, IL (US)

(72) Inventor: Zachary B. Leonard, Grimes, IA (US)

(73) Assignee: DEERE & COMPANY, Moline, IL (US)

( * ) Notice: Subject to any disclaimer, the term of this patent is extended or adjusted under 35 U.S.C. 154(b) by 49 days.

(21) Appl. No.: 18/973,441

(22) Filed: Dec. 9, 2024

(65) Prior Publication Data

US 2026/0161177 A1 Jun. 11, 2026

(51) Int. Cl.
| | |
|---|---|
| *G05D 1/646* | (2024.01) |
| *B62D 15/02* | (2006.01) |
| *G05D 1/248* | (2024.01) |
| *G05D 105/15* | (2024.01) |
| *G05D 107/20* | (2024.01) |
| *G05D 107/70* | (2024.01) |

(52) U.S. Cl.
CPC ........... *G05D 1/646* (2024.01); *B62D 15/025* (2013.01); *G05D 1/248* (2024.01); *G05D 2105/15* (2024.01); *G05D 2107/21* (2024.01); *G05D 2107/70* (2024.01)

(58) Field of Classification Search
CPC .... G05D 1/646; G05D 1/248; G05D 2105/15; G05D 2107/21; G05D 2107/70; B62D 15/025
USPC .......................................... 701/41, 42, 43, 44
See application file for complete search history.

(56) References Cited

U.S. PATENT DOCUMENTS

| | | | | |
|---|---|---|---|---|
| 11,178,805 B2 * | 11/2021 | Robinson | ............. | G05D 1/0212 |
| 11,914,379 B2 * | 2/2024 | Liu | ...................... | A01B 79/005 |
| 2021/0000004 A1 | 1/2021 | Robinson | | |

\* cited by examiner

*Primary Examiner* — Hai H Huynh
(74) *Attorney, Agent, or Firm* — Harness, Dickey & Pierce, P.L.C.

(57) ABSTRACT

Systems, methods, and non-transitory computer-readable media for vehicle navigation using path following. A system on a vehicle includes a receiver of a positioning system, the receiver being configured to obtain a current geographical position of the receiver, the receiver being at a first location on the vehicle, and processing circuitry configured to determine a current geographical position of a control guide point based the current geographical position of the receiver, the first location and a second location on the vehicle, the control guide point being at the second location being different from the first location, and cause the system to control the vehicle to follow a path based on the current geographical position of the control guide point.

20 Claims, 7 Drawing Sheets

200

PROCESSOR 210

MEMORY 220

POSITIONING SYSTEM 230

MECHANICAL CONTROL SYSTEM 240

USER INTERFACE 250

IMPLEMENT DETECTION SYSTEM 260

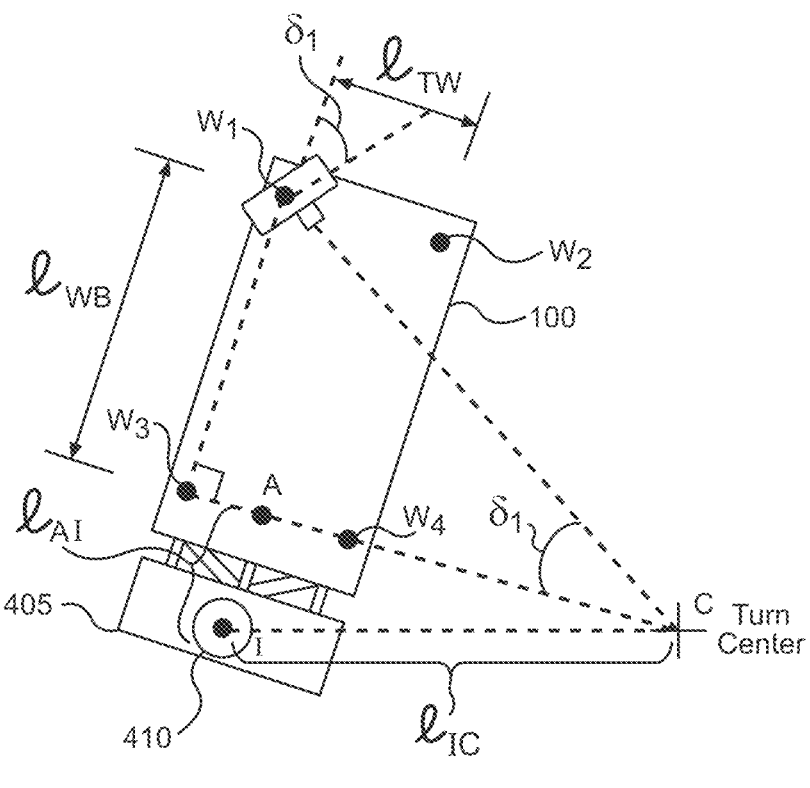
FIG. 5B
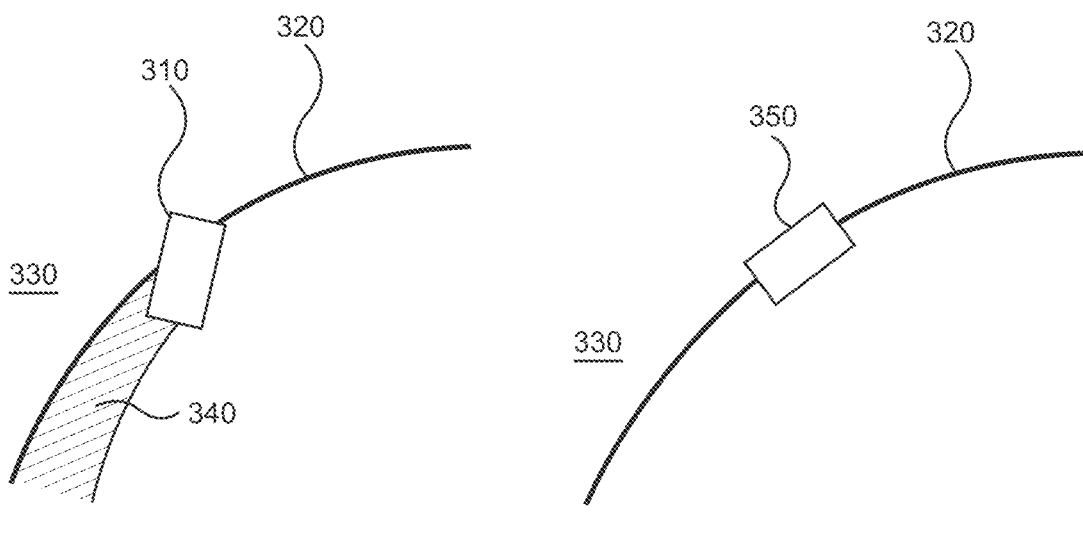
FIG. 6A                  FIG. 6B

SYSTEMS, METHODS AND NON-TRANSITORY COMPUTER-READABLE MEDIA FOR VEHICLE NAVIGATION USING PATH FOLLOWING BASED ON CONTROL GUIDE POINT

FIELD OF THE DISCLOSURE

Some example embodiments provide systems, methods and non-transitory computer-readable media for performing path following for vehicle navigation using a control guide point.

BACKGROUND

In agricultural and/or industrial applications, autonomous vehicles are controlled to navigate an operational area by following a path. For example, the autonomous vehicles determine an amount of error between a position on the vehicle and the path, and steer the vehicle to reduce the amount of error.

SUMMARY

Some example embodiments provide improved systems, methods and non-transitory computer-readable media that reduce vehicle deviations from a followed path.

Some example embodiments provide a system on a vehicle, the system including a receiver of a positioning system, the receiver being configured to obtain a current geographical position of the receiver, the receiver being at a first location on the vehicle, and processing circuitry configured to determine a current geographical position of a control guide point based the current geographical position of the receiver, the first location and a second location on the vehicle, the control guide point being at the second location being different from the first location, and cause the system to control the vehicle to follow a path based on the current geographical position of the control guide point.

Some example embodiments provide a method including determining a current geographical position of a control guide point based on a current geographical position of a receiver of a positioning system, a first location on a vehicle and a second location on the vehicle, the receiver being at the first location, the control guide point being at the second location, and the second location being different from the first location, and controlling the vehicle to follow a path based on the current geographical position of the control guide point.

Some example embodiments provide a non-transitory computer-readable medium storing instructions that, when executed by at least one processor, cause the at least one processor to perform a method, the method including determining a current geographical position of a control guide point based on a current geographical position of a receiver of a positioning system, a first location on a vehicle and a second location on the vehicle, the receiver being at the first location, the control guide point being at the second location, the second location being different from the first location, and controlling the vehicle to follow a path based on the current geographical position of the control guide point.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

FIGS. 5A and 5B illustrates an example for path following based on the current position of the control guide point, according to some example embodiments;

FIGS. 6A and 6B illustrate a comparison between a vehicle following a curved path based on a GPS receiver position and a vehicle following the curved path based on a control guide point, according to some example embodiments.

DETAILED DESCRIPTION

Figure 1:
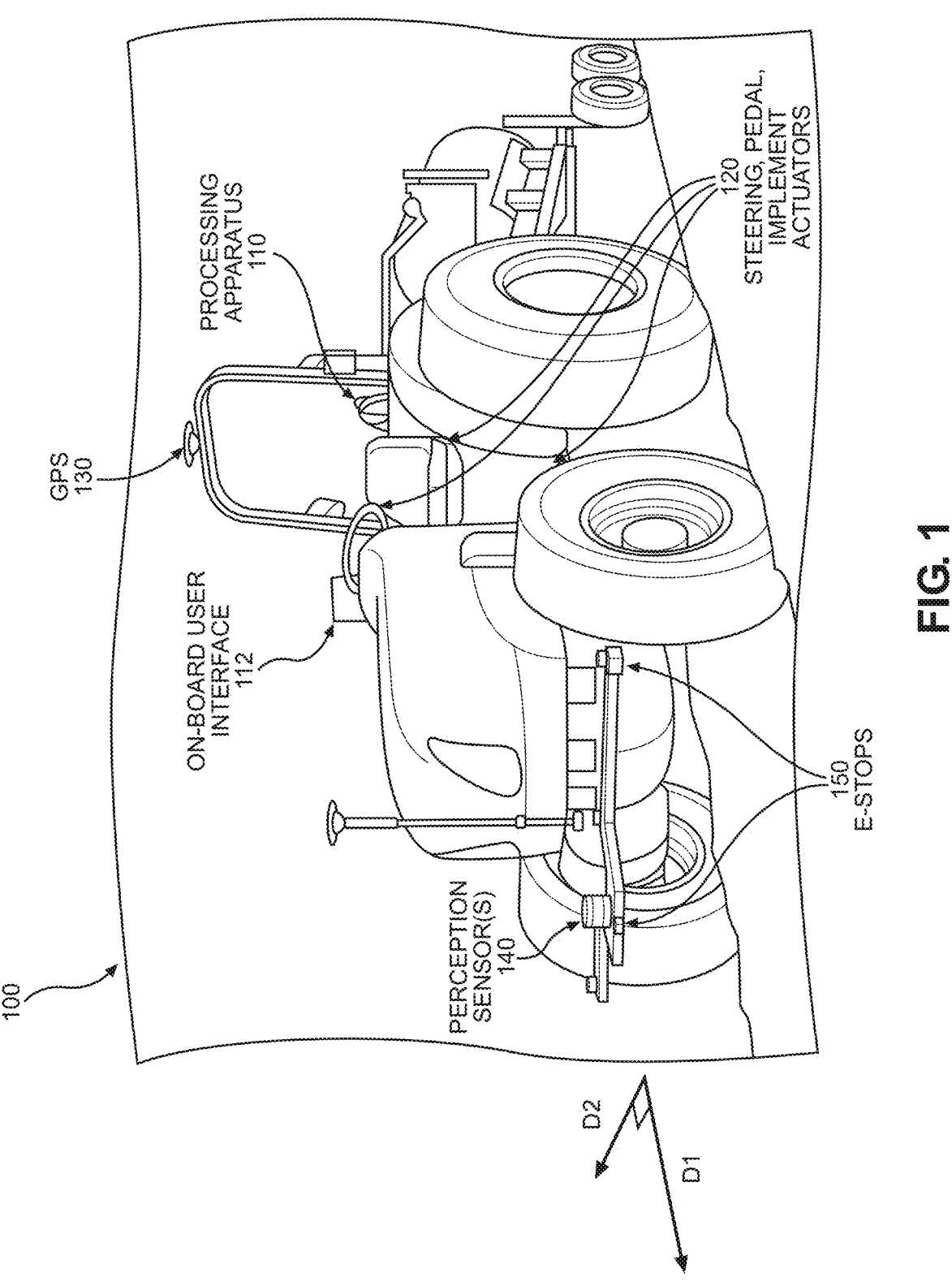
FIG. 1 illustrates a vehicle, in accordance with some example embodiments.

A vehicle that navigates using path following may rely on satellite navigation signals received by, for example, a Global Navigation Satellite System (GNSS) receiver (such as a Global Positioning System (GPS) receiver) located on the vehicle. In existing devices and methods, for example, the vehicle may follow the path by determining a position of the vehicle using the GNSS receiver, and calculating an error (e.g., a lateral error) between the vehicle's position and the path. The vehicle may then adjust a steering angle to minimize or reduce the error. Of note, in the existing devices and methods, the vehicle's position is represented by the position of the GNSS receiver, and it is the position of the GNSS receiver that is used to calculate the error and adjust the steering angle. The position of the GNSS receiver is generally based on GNSS requirements (or standards, etc.) for antenna reception.

In the existing devices and methods, the GNSS receiver is located at one of various fixed positions on the vehicle, such as in the cab at the front of the vehicle. However, using the fixed position of the GNSS receiver for path following results in excessive deviations by the vehicle from the path. For example, in a scenario in which the path is curved, the vehicle would control the steering angle such that the position of the GNSS receiver follows the curve. However, in such a scenario, the rear end of the vehicle would stray from the path by a magnitude that increases with the length of the vehicle. For example, in a scenario in which the fixed position of the GNSS receiver is at the front of the vehicle (e.g., on or in the cab of the vehicle), a front wheel-steered vehicle would stray from the path to a position inside of the curve, and a rear wheel-steered vehicle would stray from the path to a position outside of the curve. Due to this straying of the vehicle from the path, for example, the existing devices and methods may result in the vehicle overrunning and damaging a crop in circumstances in which the vehicle is following a curved path in an agricultural field.

In another scenario, various implements of different types may be attachable to the vehicle. For example, the implements may be attached to the front or the rear of the vehicle, and may have a varying angle or a fixed angle with respect to the vehicle. The position of the GNSS receiver may be distant from an implement attached to the vehicle (e.g., several meters away from the implement). In this scenario, the use of the fixed position of the GNSS receiver for path following results in misalignment of the implements for their respective tasks in addition (or alternatively) to the crop damage discussed above.

In summary, the existing devices and methods for vehicle navigation using path following may result in excessive deviations by the vehicle (including any attached implements) from the path causing damage to a crop. However, example embodiments provide improved devices and methods for vehicle navigation using path following as discussed further below.

FIG. 1 illustrates a vehicle, in accordance with some example embodiments.

Referring to FIG. 1, depicted is a side view of a vehicle 100. In FIG. 1, the vehicle is illustrated as being a tractor with a sprayer attached to the rear of the tractor, however some example embodiments are not limited thereto. According to some example embodiments, the vehicle 100 may be a harvester (e.g., a combine harvester, etc.), a self-propelled sprayer, a windrower, a tractor (with or without a front or rear implement attached), or any other vehicle. For example, the vehicle 100 may be any vehicle for use in performing agricultural or industrial operations. The vehicle 100 may include a processing apparatus 110, an on-board user interface 112 (e.g., including a touchscreen), steering, pedal and implement actuators 120 (e.g., a steering actuator(s), a pedal actuator(s) and/or an implement actuator(s)) configured to control the vehicle 100 (and/or any implements attached thereto) via a manual control interface of the tractor, a global positioning system (GPS) receiver 130 mounted on the cab of the vehicle 100, one or more perception sensors 140, and/or e-stops 150 configured to shut down the vehicle 100 when they are pressed or activated (collectively referred to herein as the components of the vehicle 100). However, some example embodiments are not limited to, and the vehicle 100 may include additional and/or fewer components relative to those mentioned above. For example, according to some example embodiments, the vehicle 100 may include a computer vision system and/or mechanical feeler sensors.

According to some example embodiments, the vehicle 100 may be autonomous (e.g., fully autonomous or partially autonomous), but some example embodiments are not limited thereto and the vehicle 100 may be controlled (e.g., at least partially controlled) by an operator. According to some example embodiments, the GPS receiver 130 is just an example, and the receiver 130 may be a receiver for any GNSS. According to some example embodiments, the GPS receiver 130 is fixedly mounted on the cab of the vehicle 100, but some example embodiments are not limited there to and the GPS receiver 130 may be fixedly mounted at any location of the vehicle 100 (e.g., at a preset, or otherwise given location on the vehicle 100). One or more implements may be attached (e.g., removably attached) to the vehicle 100. For example, types of the implements may include tillers, seeders, planters, sprayers, harvesting blades, cutters, mowers, shredders, rippers, various types of harvester headers (e.g., for harvesting corresponding types of crops such as sugar, cotton, etc.), or any other implements (e.g., any other implements for performing an agricultural or industrial operation). Implements may be removably attached to a tractor or any other vehicle 100 (e.g., the harvester, the self-propelled sprayer, the windrower, etc.). The below description may mainly discuss implements in the context of tractors for conciseness of the description, however the vehicle 100 is not limited thereto. According to some example embodiments, each of the types implements may also be implemented as a corresponding self-propelled vehicle 100 (e.g., a tiller vehicle, a seeder vehicle, a planter vehicle, a sprayer vehicle, a harvester vehicle, a cutter vehicle, a mower vehicle, a shredder vehicle, a ripper vehicle, etc.). The vehicle 100 may be a front-steered vehicle and/or a rear-steered vehicle. The below description may mainly discuss the vehicle 100 in the context of front-steered vehicles for conciseness of the description.

Figure 2:
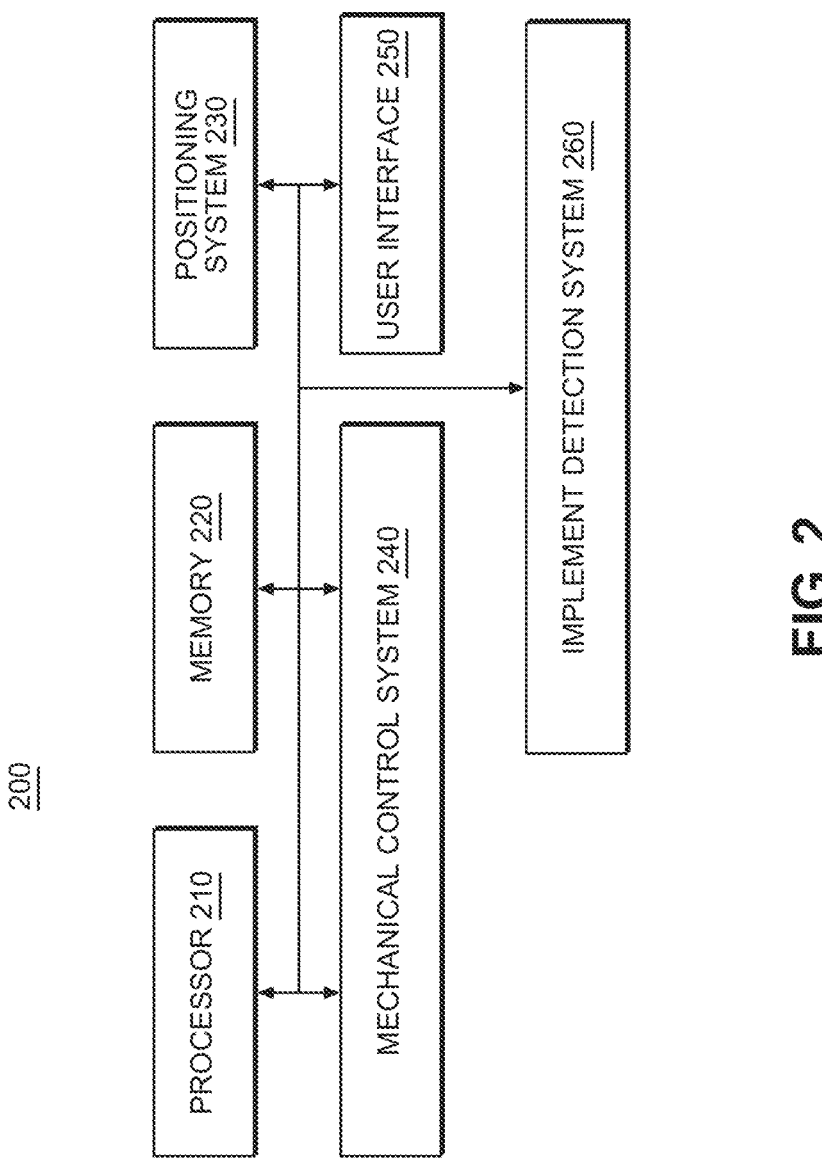
FIG. 2 illustrates a system for controlling a vehicle, according to some example embodiments.

FIG. 2 illustrates a system for controlling a vehicle, according to some example embodiments.

Referring to FIG. 2, a system 200 may include a processor 210, a memory 220, a positioning system 230, a mechanical control system 240, a user interface (UI) 250 and/or an implement detection system 260 (collectively referred to herein as the components of the system 200). According to some example embodiments, the system 200 may be included on the vehicle 100 but some example embodiments are not limited thereto. According to some example embodiments, the system 200 may include more or fewer components than those discussed above. For example, the system 200 may also include a communication system for communicating information with external devices.

The processor 210 (e.g., the processing apparatus 110) may control overall operation of the system 200 and may be implemented using processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), a digital signal processor, a microcomputer, a field programmable gate array (FPGA), a System-on-Chip (SoC), a programmable logic unit, a microprocessor, application-specific integrated circuit (ASIC), etc.

The processor 210 may store and/or retrieve data to and/or from the memory 220 (e.g., programming instructions for execution by the processor 210, operational data generated by the processor 210, etc.). The processor 210 may communicate with, and/or control, the positioning system 230, the mechanical control system 240, the UI 250 and/or the implement detection system 260.

The memory 220 may be a tangible, non-transitory computer-readable medium, such as a Random Access Memory (RAM), a flash memory, a Read Only Memory (ROM), an Electrically Programmable ROM (EPROM), an Electrically Erasable Programmable ROM (EEPROM), registers, a hard disk, a removable disk, a Compact Disk (CD) ROM, any combination thereof, or any other form of storage medium known in the art. The memory 220 may store data and/or instructions for retrieval by, for example, the processor 210.

The positioning system 230 may receive one or more signals representative of a current position of the vehicle 100 and/or information from which the current position of the vehicle 100 may be calculated (e.g., by the positioning system 230 and/or the processor 210). According to some example embodiments, the positioning system 230 may include a receiver capable of receiving signals from a satellite navigation system (e.g., a GNSS) such as, for example, the Global Positioning System (GPS), the Global Navigation Satellite System (GLONASS), the BeiDou Navigation Satellite System (BDS), etc. For example, the positioning system 230 may include the GPS receiver 130 and may receive the one or more signals from satellites of the GPS. According to some example embodiments, the positioning system 230 may include another GPS receiver 130 on an attached implement, and may also (or alternatively) receive the one or more signals via the other GPS receiver 130, but some example embodiments are not limited thereto. According to some example embodiments, the positioning system 230 may provide the current position of the vehicle 100 (e.g., the current position of the GPS receiver 130) to the processor 210 and/or the memory 220 at a periodic interval that may be predefined (or alternatively, given), aperiodically, or continuously. According to some example embodiments, the current position may include current x and y coordinates of the vehicle 100 (e.g., Easting and Northing, respectfully), a heading angle of the vehicle 100, a time corresponding to the current position of the vehicle 100, a velocity of the vehicle 100, a yaw rate of the vehicle 100, etc. According to some example embodiments, the positioning system 230 may be implemented using processing circuitry. The receiver of the positioning system 230 is mainly referred to herein as being the GPS receiver 130, but some example embodiments are not limited to, and any receiver of a navigation system (e.g., a satellite navigation system) may be used. The receiver may be referred to herein as the GPS receiver 130 for conciseness of description and references thereto do not limit the receiver of the positioning system 230 to only GPS-based implementations.

The mechanical control system 240 may include one or more mechanical systems for controlling a movement and/or position of the vehicle 100. The mechanical control system 240 may include, for example, a steering actuator, a pedal actuator, and implement actuator, etc. (e.g., the steering, pedal and implement actuators 120). Each of the steering actuator, the pedal actuator and the implement actuator may be controlled according to corresponding commands received from the processor 210. According to some example embodiments, the mechanical control system 240 may be implemented using processing circuitry. According to some example embodiments, the steering actuator may mechanically move a support structure (e.g., wheels, tracks, etc.) of the vehicle 100 in either direction (e.g., left or right from the forward perspective of the vehicle 100) in an amount corresponding to an updated steering angle included in a command from the processor 210. According to some example embodiments, the pedal actuator may mechanically move the acceleration pedal of the vehicle 100 in either direction (e.g., in or out) in an amount corresponding to a speed adjustment value included in a command from the processor 210. According to some example embodiments, the implement actuator may mechanically move an implement attached to the vehicle 100 to perform a corresponding operation (e.g., tilling, planting, spraying, harvesting, etc.) based on one or more commands from the processor 210.

According to some example embodiments, the steering actuator may mechanically move a support structure (e.g., wheels, tracks, etc.) of the vehicle 100 in either direction (e.g., left or right from the forward perspective of the vehicle 100, such as the first direction D1) in an amount corresponding to an updated steering angle included in a command from the processor 210. For example, the mechanical control system 240 may include a steering system, such as a hydraulic steering system, an electro-hydraulic steering system, an electromechanical steering system, an electromechanical actuator, an electrical steering system, a drive-by-wire steering system or another steering system with an electrical or electronic control interface for communicating with the processor 210. In some example embodiments, the electronic control interface may include a sensor for detecting a position of a hydraulic cylinder of the steering system, and the steering actuator for controlling the position of the hydraulic cylinder or other member of the steering system, in response to commands from the processor 210. Although the steering system may use digital messages (e.g., logic level signals) to control steering, in some example embodiments the steering system may use analog signals, particularly if the steering system is configured to directly communicate with the processor 210.

According to some example embodiments, the pedal actuator may mechanically move the acceleration pedal and/or the brake pedal of the vehicle 100 in either direction (e.g., in or out) in an amount corresponding to a speed adjustment value included in a command from the processor 210. For example, the mechanical control system 240 may include a braking system, such as a hydraulic braking system, an electro-hydraulic braking system, an electromechanical braking system, an electromechanical actuator, an electrical braking system, a brake-by-wire braking system or another braking system with an electrical or electronic control interface for communicating with the processor 210. In some example embodiments, the electronic control interface may include a sensor for detecting a position of a hydraulic cylinder of the braking system, and the pedal actuator for controlling or modulating the position of the hydraulic cylinder or other member of the braking system, in response to commands from the processor 210. Although the braking system may use digital messages (e.g., logic level signals) to control braking, in some example embodiments the braking system may use analog signals, particularly if the braking system is configured to directly communicate with the processor 210.

The mechanical control system 240 may include a propulsion system having an engine controller and a motive system (e.g., an internal combustion engine, an electric motor, etc.). The engine controller may control a throttle setting, carburetor, fuel injection system, fuel-metering system or air-metering system, or other fuel delivery system for the internal combustion engine, for example. The propulsion system may include an electric motor, a drive motor, an alternating current motor, an induction motor, a permanent magnet motor, a direct current motor, or another suitable motor for propelling a vehicle. Further, the propulsion system may include a motor controller (e.g., an inverter, chopper, wave generator, variable frequency oscillator, variable current Supply, or variable Voltage Supply) for controlling the Velocity, torque, and direction of rotation of the motor shaft of the electric motor. In some example embodiments, the propulsion system may include a hybrid drive system, a parallel hybrid, system, or a series hybrid system, in which at least one of an electric motor and an internal combustion engine can propel the vehicle. For example, in a parallel hybrid system, the electric motor, the internal combustion engine or both may apply power to one or more support structures (e.g. wheels or tracks) of the vehicle 100. For a series hybrid system, the electric motor typically provides power to one or more support structures (wheels or tracks) of the vehicle 100. The engine controller may control the motive system in response to commands from the processor 210.

According to some example embodiments, the implement actuator may mechanically move an implement attached to the vehicle 100 to perform a corresponding operation (e.g., tilling, planting, spraying, harvesting, etc.) based on one or more commands from the processor 210. For example, the mechanical control system 240 may include an implement system, such as a hydraulic implement system, an electro-hydraulic implement system, an electromechanical imple-ment system, an electromechanical actuator, an electrical implement system, a drive-by-wire implement system or another implement system with an electrical or electronic control interface for communicating with the processor 210. In some example embodiments, the electronic control inter-face may include a sensor for detecting a position of a hydraulic cylinder of the implement system, and the imple-ment actuator for controlling the position of the hydraulic cylinder or other member of the implement system, in response to commands from the processor 210. Although the implement system may use digital messages (e.g., logic level signals) to control the implement, in some example embodiments the implement system may use analog signals, particularly if the implement system is configured to directly communicate with the processor 210.

The UI 250 (e.g., the on-board user interface 112) may include one or more devices for communicating information to, and/or receiving information from, an operator of the vehicle 100. The UI 250 may include a touch screen display, but is not limited thereto and may include any device, or combination of devices, for inputting and outputting infor-mation. Information displayed on the UI 250 may be received from the processor 210, and information input to the UI 250 may be provided to the processor 210 and/or the memory 220.

The implement detection system 260 may detect whether one or more implements are attached to the front and/or rear of the vehicle 100. The implement detection system 260 may provide the processor 210 with an indication of each imple-ment attached to the vehicle. The indication may identify a type of the implement (e.g., seeder, sprayer, etc.) and/or a relative location of the implement (e.g., front of vehicle or rear of vehicle). According to some example embodiments, the implement detection system 260 may receive an indica-tion of the type of the implement from the implement over a Controller Area Network (CAN) bus (e.g., configured according to the CAN ISOBUS Standard, International Organization for Standardization (ISO) 11783) of the vehicle 100. According to some example embodiments, the implement detection system 260 may receive the indication upon attachment of the implement (or promptly after attach-ment of the implement), but some example embodiments are not limited thereto. According to some example embodi-ments, the implement detection system 260 may be imple-mented using processing circuitry.

Figure 3:
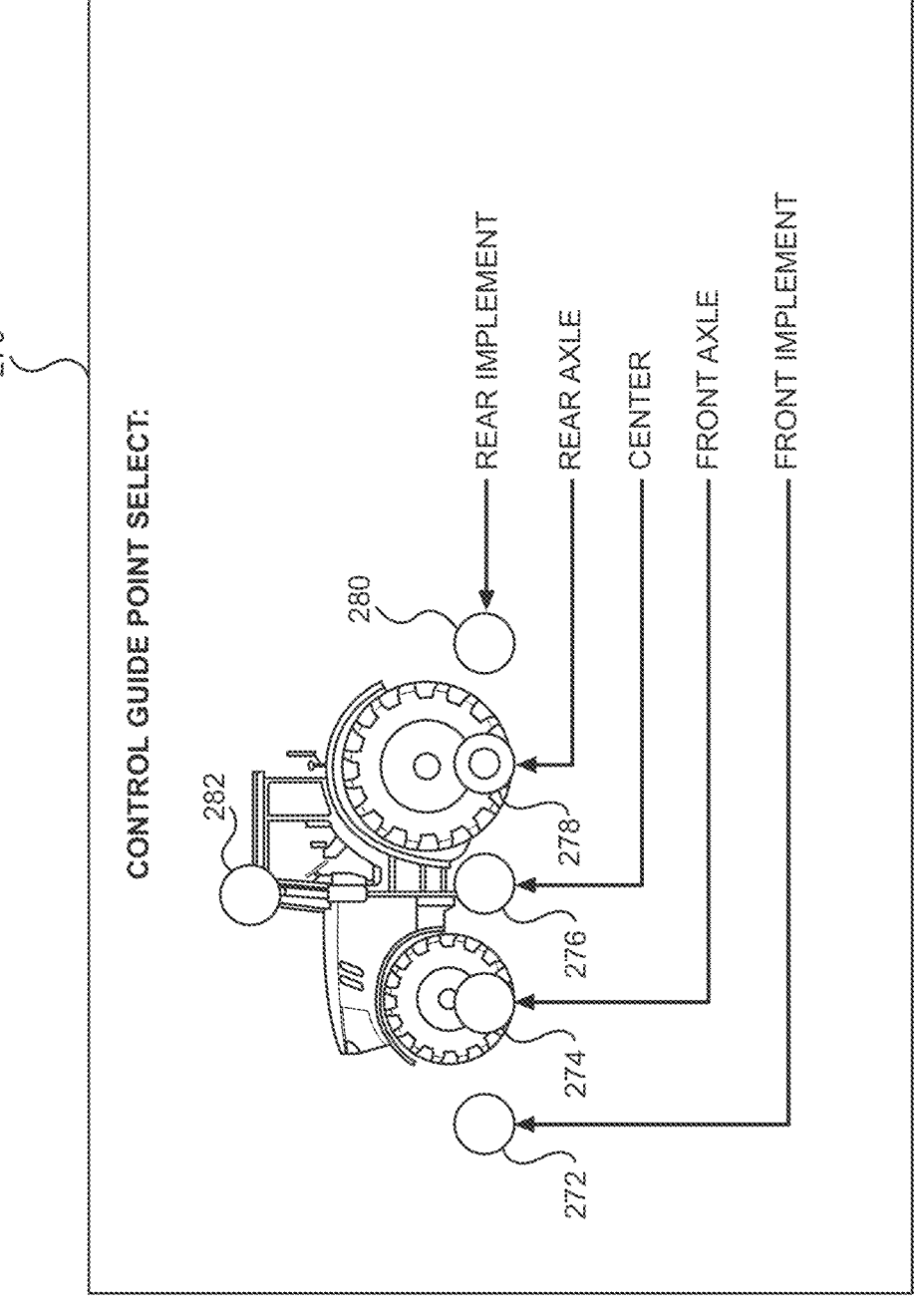
FIG. 3 illustrates an example user interface for selecting a control guide point, according to some example embodiments.

FIG. 3 illustrates an example user interface for selecting a control guide point, according to some example embodi-ments.

Referring to FIGS. 2 and 3, according to some example embodiments, the processor 210 may obtain a control guide point from an operator (e.g., an operator of the vehicle 100). The control guide point may be a location on the vehicle 100 different from the location of the GPS receiver 130 on the vehicle 100, but some example embodiments are not limited thereto. According to some example embodiments, the pro-cessor 210 may control the UI 250 to display a set of candidate control guide points from among which the opera-tor may select a desired control guide point. Referring to FIG. 3, for example, the UI 250 may display a screen 270 having the set of candidate control guide points which may include a point 272 on a front implement of the vehicle 100, a point 274 on a front axle of the vehicle 100, a point 276 at a center of the vehicle 100, a point 278 on a rear axle of the vehicle 100, a point 280 on a rear implement of the vehicle 100, a point 282 on the cab of the vehicle 100, etc., but some example embodiments are not limited thereto. According to some example embodiments, the screen 270 may include one or more points that are not located on the vehicle (e.g., may be located nearby the vehicle) for selec-tion by the operator as the desired control guide point. FIG. 3 depicts an example in which the point 278 on the rear axle of the vehicle 100 has been selected by the operator as indicated by a circle inside a radio button associated with the point 278. According to some example embodiments, the processor 210 may control the UI 250 to display an image including the vehicle 100 and enable the operator to select a desired control guide point at any location on the vehicle, or nearby the vehicle, (e.g., by touching/selecting a location on the displayed image). According to some example embodiments, the control guide point obtained from the operator may have been determined (e.g., by the operator) such that path following performed based on the control guide point minimizes or reduces deviations by the vehicle 100 from the path, and/or misalignment of an attached implement(s) for a task to be performed, during an operation (e.g., an agricultural or industrial operation) of the vehicle 100.

According to some example embodiments, the processor 210 may receive an indication of a first implement attached to the vehicle 100 (e.g., from the implement detection system 260). The processor 210 may automatically select a control guide point based on the indication. According to some example embodiments, the indication may include the control guide point (e.g., the location of the control guide point), but some example embodiments are not limited thereto. According to some example embodiments, the pro-cessor 210 may compare a type of the first implement identified in the indication, and/or a relative location of the implement (e.g., front of vehicle or rear of vehicle) identified in the indication, with a first look-up table (LUT) stored in the memory 220. The first LUT may include different control guide points in association with different implement types and/or implement relative locations.

According to some example embodiments, the processor 210 may use the same control guide point (or a similar control guide point(s)) throughout the operation performed by the vehicle 100, but some example embodiments are not limited thereto. According to some example embodiments, the control guide point may be changed (e.g., before, during or after the operation) to a different control guide point through, for example, any of the approaches discussed above (e.g., selection via the UI 250, attachment/detachment of an implement, etc.).

According to some example embodiments, the processor 210 may control the vehicle 100 to perform an operation (e.g., an agricultural operation or industrial operation) using path forming. For example, the vehicle 100 may perform the operation in an operation area. The operation area may be a field (e.g., an agricultural field), but some example embodi-ments are not limited thereto. The processor 210 may obtain path information defining a path, traversing the operation area, to be followed by the vehicle 100 in performing the operation. For example, the processor 210 may retrieve the path information stored in the memory 220, receive the path information from an external source (e.g., external server) using a communication system of the system 200, etc. According to some example embodiments, the path infor-mation may include a plurality of sets of geographic coordinates connected by lines that define the path. The path information may have been generated before the initiation of the operation by, for example, determining the plurality of sets of geographic coordinates based on GPS receivers positioned in plant rows in a field, tracking paths that one or more vehicles (e.g., the vehicle 100) have previously traveled, etc. The path defined by the path information may include linear portions, curved portions, etc.

According to some example embodiments, the processor 210 may control the vehicle 100 to follow the path defined in the obtained path information based on the control guide point. In order to follow the path, according to some example embodiments, the processor 210 may obtain (e.g., calculate, determine, etc.) the current position of the control guide point (e.g., an absolute geo-position) by translating a current position of the GPS receiver 130 (e.g., obtained from the positioning system 230) based on a location of the control guide point relative to the location of the GPS receiver 130. For example, the processor 210 may translate the current position of the GPS receiver 130 to the current position of the control guide point by obtaining a first offset in an x-direction and a second offset in a y-direction. According to some example embodiments, the x-direction and y-direction may correspond to x and y coordinates of the GNSS, respectively (e.g., East and North, respectively).

Figure 4:
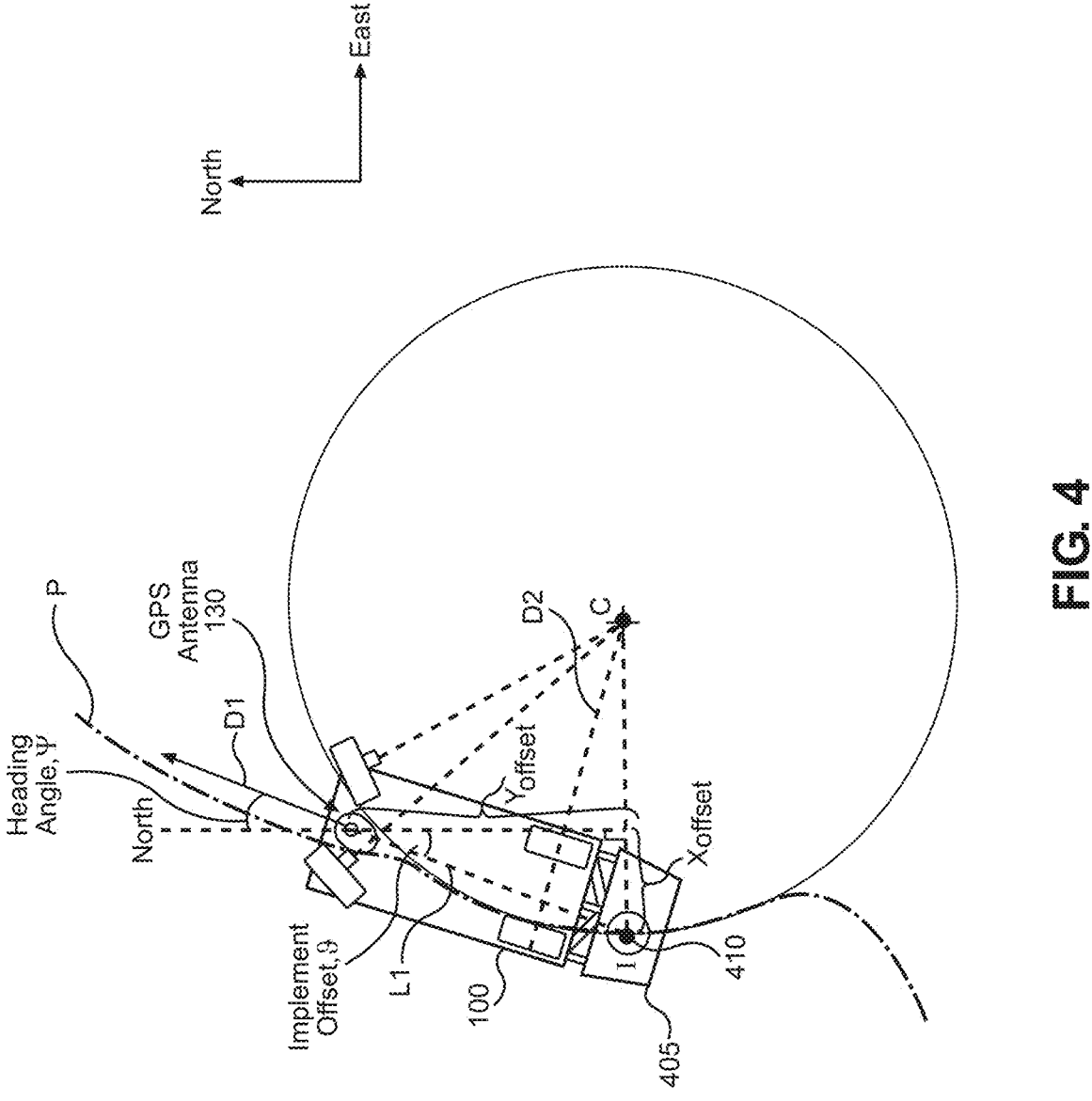
FIG. 4 illustrates an example for obtaining the current position of the control guide point, according to some example embodiments.

FIG. 4 illustrates an example for obtaining the current position of the control guide point, according to some example embodiments.

Referring to FIGS. 2 and 4, the vehicle 100 is following a path P including a curve having a center at point C. An implement 405 is attached to a rear end of the vehicle 100, and location of the control guide point 410 is selected to be on the implement 405. As illustrated in FIG. 1, the first direction D1 may be towards the front of the vehicle 100 (e.g., parallel to a wheelbase of the vehicle 100), and the second direction D2 may be towards one of the sides of the vehicle 100 (e.g., parallel to the tread width of the vehicle and perpendicular to the first direction).

According to some example embodiments, in scenarios in which the control guide point 410 is obtained from the operator, the processor 210 may obtain (e.g., calculate, determine, retrieve from the memory 220, etc.) a location of the control guide point 410 (e.g., relative to the vehicle 100), for example, vehicle-based coordinates in the first and second directions (e.g., D1 and D2) representing the location of the control guide point 410 (e.g., relative to the vehicle 100), and may determine a first line L1 connecting the GPS receiver 130 and the control guide point 410 based on relative differences in location between the control guide point 410 and GPS receiver 130 in the first and second directions. The processor 210 may obtain the vehicle-based coordinates of the control guide point 410 obtained from the operator based on a mapping between locations on the vehicle 100 and corresponding vehicle-based coordinates in the first and second directions stored in the memory 220, but some example embodiments are not limited thereto. According to some example embodiments, the processor 210 may determine the vehicle-based coordinates of the control guide point 410 obtained from the operator based on dimensions of the vehicle 100 stored in the memory 220. According to some example embodiments, the processor 210 may determine a directionality of the first line L1 based on the difference between corresponding vehicle-based coordinates of the control guide point 410 and GPS receiver 130 in the first and second directions. According to some example embodiments, the vehicle-based coordinates of the GPS receiver 130 (e.g., relative to the vehicle 100) in the first and second directions may be stored in the memory 220. According to some example embodiments, the vehicle-based coordinates of the control guide point 410 may be defined relative to the GPS receiver 130 rather than relative to the vehicle 100, and the processor 210 may determine a directionality of the first line L1 based on the vehicle-based coordinates of the control guide point 410.

According to some example embodiments, in scenarios in which the control guide point 410 is obtained from the implement 405, the processor 210 may obtain (e.g., calculate, determine, retrieve from the memory 220, etc.) the directionality of the first line L1 from the implement 405 (e.g., over the CAN bus of the vehicle 100), however some example embodiments are not limited thereto. According to some example embodiments, the processor 210 may obtain the vehicle-based coordinates of the control guide point 410 from the implement 405, and may determine the directionality of the first line L1 based on the vehicle-based coordinates using an approach similar those discussed above. According to some example embodiments, the processor 210 may obtain the type of the control guide point 410 from the implement 405, may determine the vehicle-based coordinates of the control guide point 410 based on an association between the type of the implement and the vehicle-based coordinates (e.g., stored in the memory 220), and may determine the directionality of the first line L1 based on the vehicle-based coordinates using an approach similar those discussed above.

According to some example embodiments, the processor 210 may calculate (e.g., determine, etc.) a current geographical position of the control guide point 410 (e.g., an absolute geo-position) by translating a current position of the GPS receiver 130 (e.g., obtained from the positioning system 230) based on the directionality of the first line L1. For example, according to some example embodiments, the positioning system 230 may provide the current position of the GPS receiver 130 to the processor 210 and/or the memory 220 at a periodic interval that may be predefined (or alternatively, given). According to some example embodiments, the current position may include current x and y coordinates (e.g., geographical coordinates) of the GPS receiver 130 (e.g., Easting and Northing, respectfully), a heading angle of the vehicle 100, etc. The processor 210 may calculate the first offset in the x-direction (e.g., Easting) and the second offset in a y-direction (e.g., Northing) using the below equation set.

$$x_{offset} = \theta \sin(\varphi) \qquad \text{Equation set 1}$$
$$y_{offset} = \theta \cos(\varphi)$$

In the above equations, $x_{offset}$ and $y_{offset}$ represent the first offset in the x-direction (e.g., Easting) and the second offset in a y-direction (e.g., Northing), respectfully. $\varphi$ represents the current heading angle of the GPS receiver 130 obtained from the positioning system 230. $\theta$ represents the angle between the first line L1 and the North-South axis. According to some example embodiments, the processor 210 may translate the current position of the GPS receiver 130 into the current geographical position of the control guide point 410 based on the difference between corresponding geographical coordinates of the control guide point and GPS receiver 130 in the x-direction (e.g., Easting) and y-direction (e.g., Northing) using the $x_{offset}$ and $y_{offset}$, respectively. According to some example embodiments, the processor

210 may calculate the current geographical position of the control guide point 410 based on the current geographical position and/or heading angle of the GPS receiver 130 at a periodic interval that may be predefined (or alternatively, given), aperiodically, etc. For example, the processor 210 may calculate the current geographical position of the control guide point 410 each time the current position of the GPS receiver 130 is provided by the positioning system 230, but some example embodiments are not limited thereto.

Figure 5A:
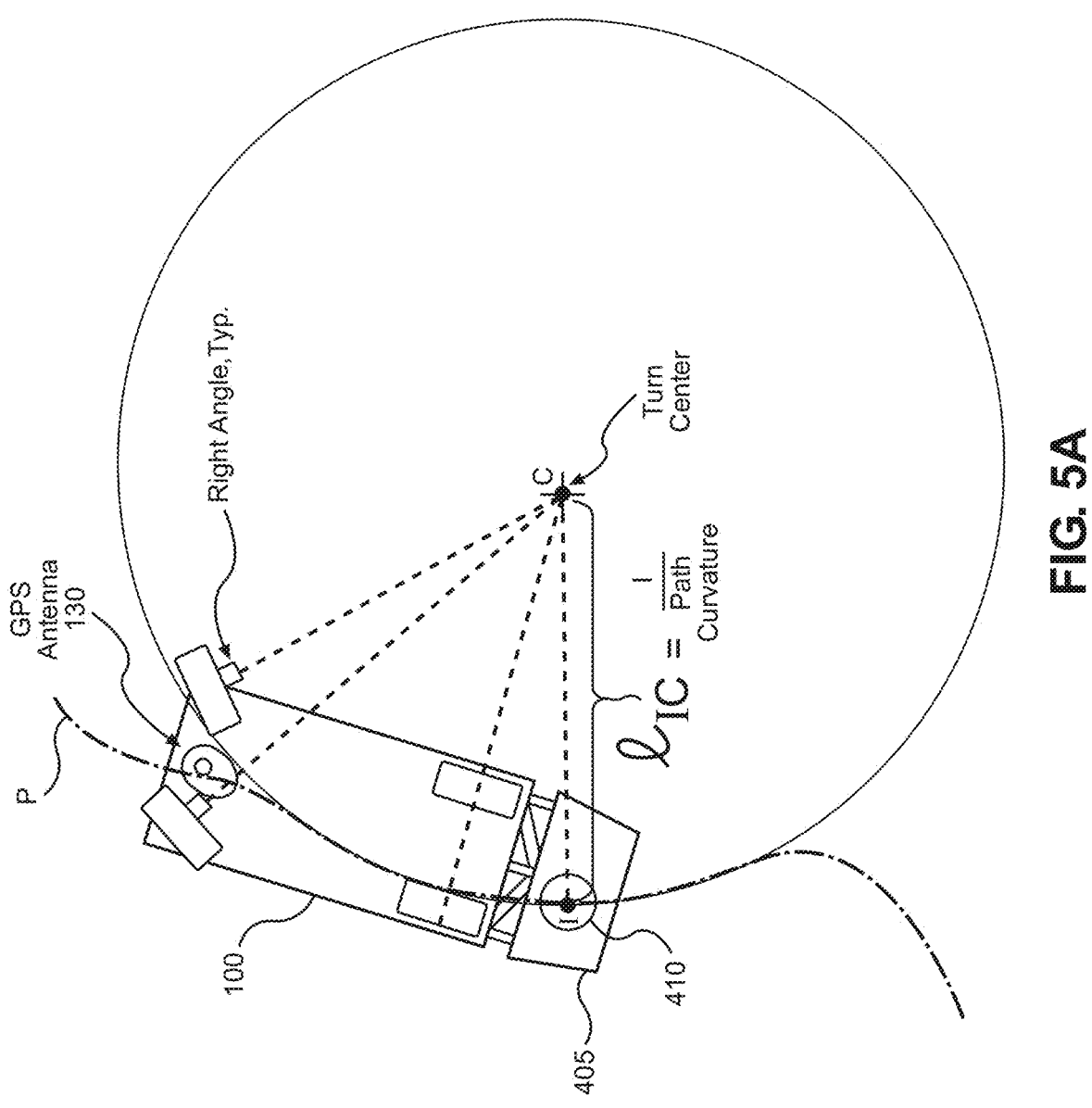

FIGS. 5A and 5B illustrates an example for path following based on the current position of the control guide point, according to some example embodiments.

Referring to FIGS. 2, 4, 5A and 5B, according to some example embodiments, the processor 210 may control the vehicle 100 to follow the path P1 defined in the obtained path information based on the current geographical position of the control guide point 410. For example, the processor 210 may control the vehicle using both feedforward and feedback techniques. According to some example embodiments, the feedforward techniques may perform open-loop control to provide an initial steering angle (e.g., a broader estimate of the steering angle to be used for following the path P1), and the feedback techniques may be used to provide an updated steering angle based on an error resulting from the initial steering angle (e.g., a finer estimate of the steering angle to be used for following the path P1). According to some example embodiments, the processor 210 may iteratively perform the feedforward techniques in sequence with the feedback techniques to follow the path P1. However, some example embodiments are not limited to these examples. In some example embodiments, only one among the feedforward techniques or the feedback technique may be performed.

According to some example embodiments, the processor 210 may calculate an initial steering angle $\delta_1$ for following the path P1 based on the current geographical position of the control guide point 410 using feedforward techniques. For example, the processor 210 may calculate an initial steering angle $\delta_1$ using the below equation set.

$$l_{W3C} = 1/2 \; l_{TW} + l_{AC} \qquad \text{Equation set 2}$$
$$l_{AC} = \sqrt{l_{IC}^2 - l_{AI}^2}$$
$$\delta_1 = \tan^{-1}(l_{WB}/l_{W3C})$$

In equation set 2, $l_{TW}$ may represent a tread width of the vehicle 100. For example, in FIG. 5B, the vehicle 100 is depicted has having wheels W1, W2, W3 and W4. The tread width of the vehicle 100 may be the length between wheels W1 and W2 (e.g., the front axle, which may be the same as, or similar to, the length between wheels W3 and W4). $l_{IC}$ may represent a length from the current geographical position of the control guide point 410 to the center point C of the curve in the path. According to some example embodiments, the processor 210 may calculate the length $l_{IC}$ as being equal to 1/(path curvature), where the path curvature of the path P1 is represented in radians (or degrees) and is obtained from the path information. According to some example embodiments, the path curvature of the path P1 may be an amount of heading angle change per unit distance long the curvature. $l_{AI}$ may represent a length from the current geographical position of the control guide point 410 to a point A in the center of the tread width (e.g., the center of the rear axle) between wheels W3 and W4. $l_{WB}$ may represent a wheel base of the vehicle 100. For example, the wheel base of the vehicle 100 may be the length between wheels W1 and W3 (e.g., between the front and rear axles, which may be the same as, or similar to, the length between wheels W2 and W4). According to some example embodiments, the memory 220 may store the tread width $l_{TW}$ and the wheel base $l_{WB}$ of the vehicle 100, and the processor 210 may retrieve the tread width $l_{TW}$ and the wheel base $l_{WB}$ to calculate the initial steering angle $\delta_1$ for following the path P1. According to some example embodiments, the processor 210 may calculate the center point C of the path P1 based on the path information, and may calculate the length $l_{IC}$ as the length from the current geographical position of the control guide point 410 to the center point C. According to some example embodiments, the processor 210 may obtain the length $l_{AI}$ from the implement detection system 260 (e.g., over the CAN bus), from the memory 220 (e.g., based on an indication of the type of the implement 405), as an input from the operator (e.g., via the UI 250), etc.

According to some example embodiments, the processor 210 may provide a command to the steering actuator (e.g., among the steering, pedal and implement actuators 120 of the mechanical control system 240) corresponding to the initial steering angle $\delta_1$. In so doing, the processor 210 may control/cause the steering actuator to mechanically move a support structure (e.g., wheels, tracks, etc.) of the vehicle 100 based on (e.g., to affect) the initial steering angle $\delta_1$. The above description of the feedforward techniques are merely an example, and some example embodiments are not limited thereto. According to some example embodiments, the feedforward techniques may be performed similar to those described in U.S. Patent Application Publication No. 2021/0000004 A1, which is incorporated by reference herein in its entirety.

According to some example embodiments, after calculation of the initial steering angle $\delta_1$, the processor 210 may calculate an updated steering angle for following the path P1 based on an error (e.g., a lateral error, a heading error and/or a yaw error) using feedback techniques. For example, the processor 210 may determine a first distance between the current geographical position of the control guide point 410 and the path P1 (also referred to herein as lateral error). According to some example embodiments, the current geographical position of the control guide point 410 at the time the first distance is determined may be based on the control of the steering actuator performed in accordance with the command corresponding to the initial steering angle $\delta_1$ (e.g., a result of the feedforward techniques), as discussed above. According to some example embodiments, the first distance may be measured as a length of a line perpendicular to the path that connects the current position of the control guide point 410 to the path. The processor 210 may calculate the updated steering angle based on the lateral error, but some example embodiments are not limited thereto. According to some example embodiments, the processor 210 may calculate the updated steering angle according to one or more among lateral error, heading error (e.g., based on a current heading angle of the control guide point 410 and the path information) and/or yaw error (e.g., based on a yaw rate of the control guide point 410 and the path information). The discussion of the error herein will mainly refer to the lateral error for conciseness of explanation.

According to some example embodiments, the processor 210 may obtain an updated steering angle (or steering angle adjustment) based on the first distance. According to some example embodiments, the processor 210 may obtain the updated steering angle (or the steering angle adjustment) by comparing the first distance with a second look-up table (LUT) stored in the memory 220. The second LUT may include different steering angles in association with different first distances. According to some example embodiments, the processor 210 may calculate the updated steering angle (or steering angle adjustment) by inputting the first distance into a first function. The first function may be determined through empirical study, but some example embodiments are not limited thereto. According to some example embodiments, the processor 210 may determine the updated steering angle (or the steering angle adjustment) based on the first distance using a feedback control algorithm (e.g., based on Proportional-Integral-Derivative (PID) principles applied to multiple variable dimensions) stored in the memory 220.

According to some example embodiments, the first distance may indicate a side of the path (e.g., left or right from the forward perspective of the vehicle 100) on which the control guide point 410 is positioned (and in which the first distance is measured/calculated), for example, lateral error on the left side of the path may be indicated with a negative first distance value and lateral error on the right side of the path may be indicated with positive first distance value. However, some example embodiments are not limited thereto, and a separate indication may be provided (e.g., by the processor 210) to indicate the side of the path on which the control guide point 410 is positioned.

The processor 210 may provide a command to the steering actuator (e.g., among the steering, pedal and implement actuators 120 of the mechanical control system 240) corresponding to the updated steering angle (or steering angle adjustment). In so doing, the processor 210 may control/cause the steering actuator to mechanically move a support structure (e.g., wheels, tracks, etc.) of the vehicle 100 based on (e.g., to affect) the updated steering angle. Thereby the processor 210 may minimize or reduce the lateral error.

According to some example embodiments, the determination of the initial steering angle 61 and the updated steering angle may be performed (in sequence) continuously or repeatedly (e.g., periodically) while the vehicle 100 performs the operation. According to some example embodiments, the operation performed by the vehicle 100 may involve the use of an attached implement. In such a scenario, the processor 210 may provide one or more commands to the implement actuator (e.g., among the steering, pedal and implement actuators 120 of the mechanical control system 240) based on an algorithm (or other computer-readable instructions) corresponding to the operation and stored in the memory 220. In so doing, the processor 210 may control/cause the implement actuator to mechanically move the implement attached to the vehicle 100 based on (e.g., to affect) the algorithm (or other computer-readable instructions).

According to some example embodiments, improved devices and methods are provided for vehicle navigation using path following. For example, as described herein, the vehicle 100 may perform the operation by performing path following based on a control guide point corresponding to a location on the vehicle different from that of the GPS receiver. For example, the control guide point may be determined such that path following performed based on the control guide point minimizes or reduces deviations by the vehicle 100 from the path, and/or misalignment of an attached implement(s) for a task to be performed, during the operation. Accordingly, occurrences of the vehicle 100 (including any attached implements) running over a crop due to path deviation may be prevented or reduced. Thus, the improved devices and methods overcome the deficiencies of the existing devices to at least reduce crop damage.

FIGS. 6A and 6B illustrate a comparison between a vehicle following a curved path based on a GPS receiver position and a vehicle following the curved path based on a control guide point, according to some example embodiments.

Referring to FIG. 6A, a vehicle 310 is following a curved path 320 in an operation area 330. The vehicle 310 is performing a path following process based on the position of the GPS receiver on the vehicle 310 (e.g., without a control guide point). As shown, the vehicle is not oriented in alignment with the curved path 320 due to the reliance on the GPS receiver position at the front of the vehicle 310. Instead, the rear end of the vehicle 310 has strayed from the path toward the interior of the curved path 320 causing damage area 340. For example, in a scenario in which the operation area 330 is a field with a standing crop, the damage area 340 may represent destroyed or damaged crop. While the illustration in FIGS. 6A and 6B depicts the vehicle 310 as a front wheel-steered vehicle that strays toward the interior of the curved path 320, some example embodiments are not limited thereto. For example, the vehicle 310 may be a rear wheel-steered vehicle that strays toward the exterior of the curved path 320.

Referring to FIG. 6B, a vehicle 350 is following the curved path 320 in the operation area 330. The vehicle 350 (e.g., the vehicle 100) is performing a path following process based on a control guide point. As shown, the vehicle is oriented in close alignment with the curved path 320, thereby minimizing or reducing the size of the damage area 340.

According to some example embodiments, the control guide point may be determined such that path following performed based on the control guide point minimizes or reduces deviations by the vehicle 100 from the path, and/or misalignment of an attached implement(s) for a task to be performed during the operation. Implementation examples include, for instance, in a scenario in which the vehicle 100 is a sprayer, the control guide point may be set to the center of the wheelbase of the vehicle 100 to avoid or reduce crop damage caused by straying from the path. Also, in a scenario in which the vehicle 100 is a harvester, the control guide point may be set to the front of the vehicle 100 to aid in aligning the harvester with the crop. This may reduce damage to the crop, and/or improve harvesting efficiency and/or productivity. Additionally, in a scenario in which the vehicle 100 is a tractor with an attached front or rear implement, the control guide point may be set by the operator. According to some example embodiments, controlling the vehicle 100 to follow a path based on the control guide point rather than the location of the GPS receiver 130 may increase the efficiency and/or productivity of operation and/or task (e.g., an agricultural operation/task, such as spraying, harvesting, tilling, planting, cutting, mowing, etc.), such as an operation and/or task performed by an implement attached to the vehicle 100.

Figure 7:
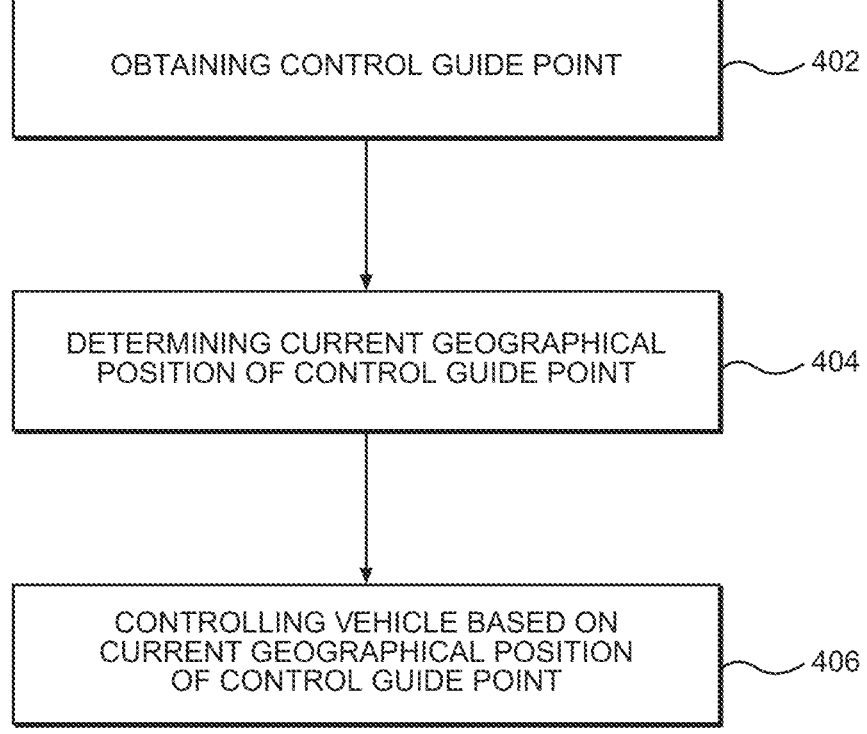
FIG. 7 illustrates a method for controlling a vehicle, according to some example embodiments.

FIG. 7 illustrates a method for controlling a vehicle, according to some example embodiments. According to some example embodiments, the method may be performed by the processor 210.

Referring to FIG. 7, in operation 402, the method may include obtaining a control guide point. For example, the processor 210 may receive the control guide point from an operator, and/or determine the control guide point based on an implement attached to the vehicle 100, according to the approaches described herein. According to some example embodiments, the control guide point may be one of a point on a front implement attached to the vehicle, a point on a front axle of the vehicle, a point at a center of the vehicle, a point on a rear axle of the vehicle, a point on a rear implement attached to the vehicle, or a point on a cab of the vehicle.

In operation 404, the method may include determining a current geographical position of the control guide point based on the current geographical position of a receiver (e.g., the GPS receiver 130) of a positioning system (e.g., the positioning system 230), a first location on the vehicle 100 and a second location on the vehicle 100. The receiver may be at first location on the vehicle 100, and the control guide point may be at the second location on the vehicle 100. The second location on the vehicle 100 may be different from the first location on the vehicle 100. The receiver may be configured to obtain the current geographical position of the receiver. According to some example embodiments, the processor 210 may translate the current position of the receiver to the current position of the control guide point according to the approaches described herein. According to some example embodiments, the processor 210 may determine at least one geographical offset (e.g., the x-offset and/or y-offset) based on a heading angle of the receiver and the second location. The processor 210 may determine the current geographical position of the control guide point based on the current geographical position of the receiver and the at least one geographical offset.

In operation 406, the method may include controlling the vehicle 100 to follow a path based on the current geographical position of the control guide point. For example, the processor 210 may control the vehicle to follow the path by determining a steering angle based on the current geographical position of the control guide point. The processor 210 may determine the steering angle based on at least one of a curve in the path or a lateral error from the path. and the processor 210 may control the steering actuator to mechanically move a support structure of the vehicle 100 based on the steering angle.

According to some example embodiments, the above-described method (e.g., operations 404 and 406) may be repeated periodically or continuously throughout an operation of the vehicle 100, but some example embodiments are not limited thereto.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm, and/or functions, described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 220).

According to some example embodiments, the memory 220 may each be a tangible, non-transitory computer-readable medium, such as a Random Access Memory (RAM), a flash memory, a Read Only Memory (ROM), an Electrically Programmable ROM (EPROM), an Electrically Erasable Programmable ROM (EEPROM), registers, a hard disk, a removable disk, a Compact Disk (CD) ROM, any combination thereof, or any other form of storage medium known in the art.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

Although terms of "first" or "second" may be used to explain various components (or parameters, values, etc.), the components (or parameters, values, etc.) are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The invention claimed is:

1. A system on a vehicle, the system comprising:
a receiver of a positioning system, the receiver being configured to obtain a current geographical position of the receiver, the receiver being at a first location on the vehicle; and
processing circuitry configured to
determine a current geographical position of a control on the current geographical position of the receiver, the first location and a second location on the vehicle, the control guide point being at the second location which is different from the first location, and
cause the system to control the vehicle to follow a path based on the current geographical position of the control guide point.

2. The system of claim 1, wherein the processing circuitry is configured to cause the system to receive the control guide point from an operator.

3. The system of claim 1, wherein the processing circuitry is configured to cause the system to control the vehicle to follow the path by determining a steering angle based on the current geographical position of the control guide point.

4. The system of claim 3, wherein the processing circuitry is configured to cause the system to determine the steering angle based on at least one of:

a curve in the path; or a lateral error from the path.

5. The system of claim 4, further comprising:

a steering actuator configured to mechanically move a
support structure of the vehicle, wherein the processing circuitry is configured to cause the
system to control the steering actuator to mechanically
move the support structure based on the steering angle.

6. The system of claim 1, wherein the processing circuitry
is configured to cause the system to determine the control
guide point based on an implement attached to the vehicle.

7. The system of claim 1, wherein the control guide point
is one of:

a point on a front implement attached to the vehicle;

a point on a front axle of the vehicle;

a point at a center of the vehicle;

a point on a rear axle of the vehicle;

a point on a rear implement attached to the vehicle; or a point on a cab of the vehicle.

8. A method, comprising:

determining a current geographical position of a control
guide point based on a current geographical position of
a receiver of a positioning system, a first location on a
vehicle and a second location on the vehicle, the
receiver being at the first location, the control guide
point being at the second location, and the second
location being different from the first location; and controlling the vehicle to follow a path based on the
current geographical position of the control guide
point.

9. The method of claim 8, further comprising:

receiving the control guide point from an operator.

10. The method of claim 8, wherein the controlling
comprises determining a steering angle based on the current
geographical position of the control guide point.

11. The method of claim 10, wherein the determining the
steering angle comprises determining the steering angle
based on at least one of:

a curve in the path; or a lateral error from the path.

12. The method of claim 11, wherein the controlling
comprises controlling a steering actuator to mechanically
move a support structure of the vehicle based on the steering
angle.

13. The method of claim 8, further comprising:

determining the control guide point based on an imple-
ment attached to the vehicle.

14. The method of claim 8, wherein the control guide
point is one of:

a point on a front implement attached to the vehicle;

a point on a front axle of the vehicle;

a point at a center of the vehicle;

a point on a rear axle of the vehicle;

a point on a rear implement attached to the vehicle; or a point on a cab of the vehicle.

15. A non-transitory computer-readable medium storing
instructions that, when executed by at least one processor,
cause the at least one processor to perform a method, the
method comprising:

determining a current geographical position of a control
guide point based on a current geographical position of
a receiver of a positioning system, a first location on a
vehicle and a second location on the vehicle, the
receiver being at the first location, the control guide
point being at the second location, the second location
being different from the first location; and controlling the vehicle to follow a path based on the
current geographical position of the control guide
point.

16. The non-transitory computer-readable medium of
claim 15, wherein the method further comprises receiving
the control guide point from an operator.

17. The non-transitory computer-readable medium of
claim 15, wherein the controlling comprises determining a
steering angle based on the current geographical position of
the control guide point.

18. The non-transitory computer-readable medium of
claim 17, wherein the determining the steering angle com-
prises determining the steering angle based on at least one
of:

a curve in the path; or a lateral error from the path.

19. The non-transitory computer-readable medium of
claim 18, wherein the controlling comprises controlling a
steering actuator to mechanically move a support structure
of the vehicle based on the steering angle.

20. The non-transitory computer-readable medium of
claim 15, wherein the control guide point is one of:

a point on a front implement attached to the vehicle;

a point on a front axle of the vehicle;

a point at a center of the vehicle;

a point on a rear axle of the vehicle;

a point on a rear implement attached to the vehicle; or a point on a cab of the vehicle.

* * * * *